Sept. 1, 1964

R. R. C. BENTON 3,147,440

CROSS-MODULATION DETECTOR MEANS TUNED TO LOCAL OSCILLATOR FREQUENCY

Filed Feb. 17, 1959

INVENTOR
Rufus R.C. Benton
BY Mitchell & Bechert
ATTORNEYS

United States Patent Office 3,147,440
Patented Sept. 1, 1964

3,147,440
CROSS-MODULATION DETECTOR MEANS TUNED TO LOCAL OSCILLATOR FREQUENCY

Rufus R. C. Benton, State College, Pa., assignor, by mesne assignments, to HRB-Singer, Inc., State College, Pa., a corporation of Delaware Filed Feb. 17, 1959, Ser. No. 793,910
1 Claim. (Cl. 325—472)

This invention relates to a cross-modulation detector of amplitude-modulated signals, and more particularly to such detector capable of detecting amplitude-modulated signals over an extremely wide frequency range.

Cross-modulation, which is a well recognized, troublesome phenomenon in the communications field, arises when the modulation on a first signal is transferred to a second signal in some non-linear passive medium such as a crystal detector or the atmosphere. Since both signals usually carry independent modulation signals, this cross-modulation has heretofore been considered undesirable because it distorts these modulation signals by intermixing. Accordingly, considerable effort, dating back to the infancy of telephony, has been spent on equipment for controlling, minimizing and eliminating cross-modulation. This invention departs radically from the prior art practices and, in fact, utilizes the phenomenon of cross-modulation for detecting amplitude-modulated signals over a wide frequency band.

Accordingly, it is a primary object of this invention to provide a cross-modulation detector for detecting amplitude-modulations.

It is a further object of this invention to provide a cross-modulation detector which is capable of detecting modulations over an extremely wide frequency band.

In accordance with an aspect of the invention, the cross-modulation detector comprises an oscillator for generating unmodulated waves having a frequency different from the amplitude modulated signals. The modulated signals and the locally generated waves are applied to a cross-modulation mixer, which is adapted to vary the amplitude of the local oscillating waves proportionally to the amplitude of the modulated signals. The output of the mixer is then applied to a receiver, which is tuned to the local oscillator frequency. The receiver is equipped with a detector to detect the amplitude variations in the mixed waves, whereby the variations correspond to the amplitude-modulated signal.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
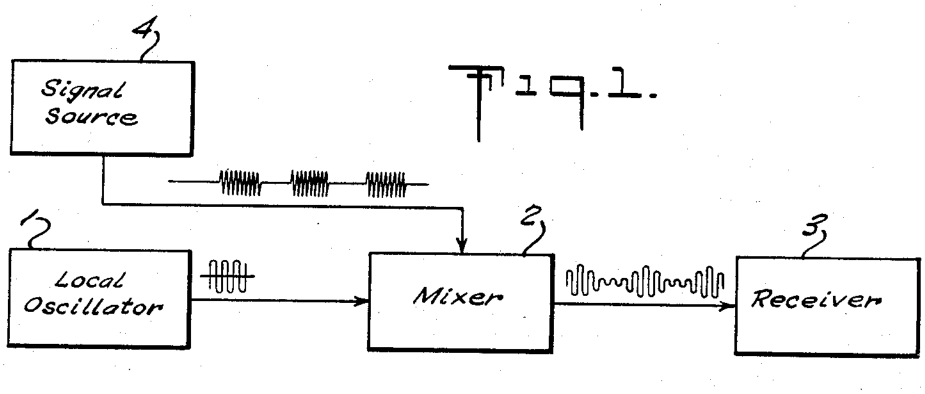
FIGURE 1 is a block diagram of a simple embodiment of the invention.

Referring now to FIGURE 1, the cross-modulation detector comprises essentially a local oscillator 1, a mixer 2, and a receiver 3 tuned to the frequency of the local oscillator. By way of example, the local oscillator may be a crystal controlled oscillator, generating unmodulated waves having a frequency of 30 mc. The local oscillations are applied to the mixer 2, which is a non-linear device and may, for example, be a crystal identified as 1N21B.

Amplitude-modulated signals are applied to the mixer 2 from a source 4. The form of the modulation may be either continuous wave or pulse. In the illustration, the amplitude modulations are shown as pulse signals. Cross-modulation in the mixer 2 causes amplitude distortion of the locally generated waves. The amplitude distortion is probably the result of third order effects, whereby the amplitude of the locally generated waves is varied by the amplitude-modulated signals and proportionally thereto, whereby the mixer output corresponds in form to the modulated signals.

It is advisable that the mixer 2 be designed so that the third order effects are optimized and have a maximum influence on the locally generated waves.

The cross-modulated waves are applied to a receiver 3 which is tuned to the local oscillator frequency. The receiver is equipped with means for detecting the amplitude variations in the cross-modulated waves.

Figure 2:
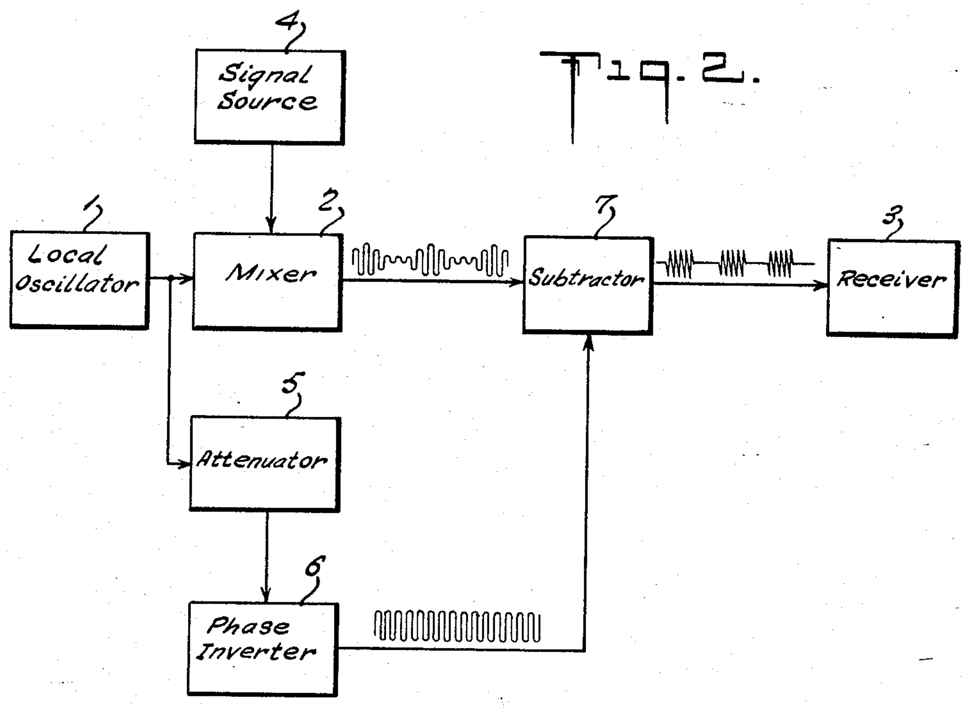
FIGURE 2 is a block diagram of a more refined embodiment of the invention, which is capable of detecting minor amplitude variations in the locally generated waves.

A refinement of the embodiment illustrated in FIGURE 1, which is capable of detecting very small changes in the cross-modulated waves, is illustrated in FIGURE 2. The circuit of FIGURE 2 is essentially the same as that of FIGURE 1, with the addition of a second channel coupled to the output of the local oscillator 1. The second channel comprises an attenuator 5 and a phase inverter 6 for inverting the local oscillator wave and applying it to a subtracter circuit 7. The subtracter circuit being also coupled to the output of the mixer 2, receives the cross-modulated waves and the phase-inverted locally generated waves, and includes means for subtracting one of the applied inputs from the other, whereby the unmodulated waves from the mixer are cancelled. Thus, at the output of the subtracter 7, only the modulations appear, which are applied to the tuned receiver 3.

By way of example, the local oscillator frequency may be of the order of 30 mc. and amplitude-modulated signals over the band 2000 mc. to 4000 mc. may be detected by the novel cross-modulation detector.

While the foregoing description sets forth the principles of the invention in connection with specific apparatus, it is to be clearly understood that this description is made only by way of example and not as a limitation of the scope of the invention as set forth in the objects thereof and in the accompanying claim.

I claim:

A cross-modulation detector, comprising a source of amplitude-modulated signals, a local oscillator for generating unmodulated waves having a frequency different from said signals, a cross-modulation mixer adapted to vary the amplitude of the oscillator waves in the presence of said signals and proportionally to the amplitude of said signals, means connecting said signal source and said oscillator to said mixer, and a receiver tuned to said oscillator frequency connected to the output of said mixer, the receiver including means for detecting amplitude variations of said oscillator waves, whereby the amplitude variations correspond to the amplitude-modulated signal, a subtracter circuit coupled between the output of said mixer and the input of said receiver, means for applying a portion of said local oscillator waves to said subtracter circuit, including an attenuator and a phase inverter, whereby the waves applied to said subtracter are of equal amplitude and opposite phase to the unmodulated waves appearing at the output of said mixer, and the unmodulated portions of the wave at the output of said mixer are cancelled in said subtracter circuit and only the modulated portions are applied to said receiver.

References Cited in the file of this patent

UNITED STATES PATENTS

| | | |
|---|---|---|
| 1,678,163 | Peterson | July 24, 1928 |
| 1,998,119 | Cox | Apr. 16, 1935 |
| 2,153,052 | Rodwin | Apr. 4, 1939 |
| 2,273,640 | Haantjes et al. | Feb. 17, 1942 |
| 2,293,628 | Reiling | Aug. 18, 1942 |
| 2,606,285 | Bataille et al. | Aug. 5, 1952 |
| 2,608,650 | Myers | Aug. 26, 1952 |
| 2,719,223 | Van der Ziel | Sept. 27, 1955 |
| 2,866,163 | Crosby | Dec. 23, 1958 |
| 2,891,147 | Spalding et al. | June 16, 1959 |